United States Patent
Bae et al.

(10) Patent No.: US 12,509,177 B1
(45) Date of Patent: Dec. 30, 2025

(54) BODY OF VEHICLE

(71) Applicants: Hyundai Motor Company, Seoul (KR); Kia Corporation, Seoul (KR)

(72) Inventors: Jin Ho Bae, Hwaseong-si (KR); Ho Sung Park, Hwaseong-si (KR); Sung Il Kim, Hwaseong-si (KR); Min Goo Im, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/051,435

(22) Filed: Feb. 12, 2025

(30) Foreign Application Priority Data

Oct. 16, 2024 (KR) ............. 10-2024-0141549

(51) Int. Cl.
| | |
|---|---|
| *B62K 5/10* | (2013.01) |
| *B62D 9/02* | (2006.01) |
| *B62D 61/08* | (2006.01) |
| *B62K 5/027* | (2013.01) |
| *B62K 5/06* | (2006.01) |
| *B62K 7/04* | (2006.01) |
| *B62K 19/30* | (2006.01) |
| *B62K 23/06* | (2006.01) |

(52) U.S. Cl.
CPC ............. *B62K 5/10* (2013.01); *B62D 9/02* (2013.01); *B62D 61/08* (2013.01); *B62K 5/027* (2013.01); *B62K 5/06* (2013.01); *B62K 7/04* (2013.01); *B62K 19/30* (2013.01); *B62K 23/06* (2013.01); *B60G 2300/122* (2013.01); *B60G 2300/45* (2013.01); *B60Y 2200/122* (2013.01); *B60Y 2200/13* (2013.01); *B62K 2201/04* (2013.01)

(58) Field of Classification Search
CPC . B62K 5/10; B62K 5/02; B62K 5/027; B62K 5/06; B62K 5/00; B62K 5/05; B62K 7/00; B62K 7/02; B62K 7/04; B62K 19/30; B62K 23/06; B62K 2201/04; B62D 9/02; B62D 61/06; B62D 61/065; B62D 61/08; B60G 2300/122; B60G 2300/45; B60Y 2200/12; B60Y 2200/122; B60Y 2200/13
USPC ........ 280/124.103, 5.509; 180/210, 215, 216
See application file for complete search history.

(56) References Cited

U.S. PATENT DOCUMENTS 3,504,934 A * 4/1970 Wallis ................ B62K 5/10
 280/282
3,781,031 A * 12/1973 Patin ................ B62D 61/08
 D12/112

(Continued)

FOREIGN PATENT DOCUMENTS

CN 2119384 U * 10/1992
CN 110497990 A * 11/2019 ............. B62K 5/02

(Continued)

*Primary Examiner* — Keith J Frisby
(74) *Attorney, Agent, or Firm* — Slater Matsil, LLP

(57) ABSTRACT

A body of a vehicle can include a front structure including a front wheel of the vehicle; a rear structure including a rear wheel of the vehicle; a rotation shaft connecting the front structure and the rear structure and allowing the front structure and the rear structure to rotate relative to each other; and an elastic system providing a return force in the opposite direction of the relative rotation in response that the front structure and the rear structure rotate relative to each other is disclosed.

20 Claims, 14 Drawing Sheets

(56) References Cited

U.S. PATENT DOCUMENTS

| | | | | |
|---|---|---|---|---|
| 3,938,609 | A | * | 2/1976 | Kensaku .................. B62K 5/10 267/276 |
| 4,159,752 | A | * | 7/1979 | Kanno .................... B62K 5/025 280/282 |
| 4,316,520 | A | * | 2/1982 | Yamamoto ............. B62D 61/08 180/215 |
| 2002/0163154 | A1 | * | 11/2002 | Ozeki ...................... B62K 5/10 280/124.133 |
| 2007/0152422 | A1 | * | 7/2007 | Lin .......................... B62K 5/10 280/275 |
| 2021/0024166 | A1 | * | 1/2021 | Tseng ...................... B62K 5/06 |
| 2023/0391416 | A1 | * | 12/2023 | Mori ....................... B62K 5/027 |

FOREIGN PATENT DOCUMENTS

| | | | | | |
|---|---|---|---|---|---|
| CN | 113093775 | A | * | 7/2021 | ............... B62K 5/10 |
| CN | 113415370 | A | * | 9/2021 | ............... B62K 5/10 |
| CN | 115023391 | A | * | 9/2022 | ............. B62K 19/46 |
| EP | 3421342 | A1 | * | 1/2019 | ............... B62K 5/10 |
| EP | 4397582 | A1 | * | 7/2024 | ............... B62K 7/04 |
| JP | 2007050723 | A | * | 3/2007 | |
| JP | 4132220 | B2 | * | 8/2008 | |
| KR | 102511761 | B1 | * | 3/2023 | ............... B62K 5/10 |
| KR | 102511768 | B1 | * | 3/2023 | ............. B62D 39/00 |
| WO | WO-2023073855 | A1 | * | 5/2023 | ............ B62J 45/413 |
| WO | WO-2024065024 | A1 | * | 4/2024 | ............... B62K 5/10 |

* cited by examiner

BODY OF VEHICLE

CROSS-REFERENCE TO RELATED APPLICATIONS

This application claims the priority and benefit of Korean Patent Application No. 10-2024-0141549, filed Oct. 16, 2024, which application is hereby incorporated herein by reference in its entirety.

TECHNICAL FIELD

The present disclosure relates to a vehicle that allows a front structure and a rear structure to rotate relative to each other.

BACKGROUND

Small vehicles, including three-wheeled vehicles, and vehicles with relatively low-cost front-wheel suspension structures offer several advantages in design and cost reduction but carry the inherent risk of rollover.

Such small vehicles as described above are designed to be compact and lightweight and often adopt low-cost front-wheel suspension structures to simplify structure and reduce costs. This design choice may lead to a relatively high or imbalanced center of gravity, which may compromise the vehicle's stability during turns and driving.

Furthermore, these small vehicles are designed with short wheelbases, which may reduce the body stability of the vehicle and increase the risk of rollover during sharp turns or impacts. In addition, overloading or having too many occupants may exacerbate the uneven weight distribution, further destabilizing the vehicle's center of gravity and increasing the risk of rollover.

In particular, the instability of the center of gravity of three-wheeled vehicles with a single front tire at the center increases the risk of rollover compared to four-wheeled vehicles. In three-wheeled vehicles, the battery is placed under the front seat and the drive motor is positioned at the center of the rear wheels so that the center of gravity rises when cargo or passengers are loaded in the rear, further increasing the risk of rollover. In addition, three-wheeled vehicles typically adopt low-cost front-wheel suspension structures so that issues such as tube bending during turns or wheelbase shortening may further increase the risk of rollover during a braking dive or sharp turn.

There remains room for improvement in the vehicle tilting and suspension systems to prevent rollover accidents during turns.

The matters described above as background technology are intended for a better understanding of the background of the present disclosure and do not acknowledge that the present disclosure pertains to conventional technology already publicly known, available, or in use.

SUMMARY

Various embodiments of the present disclosure relate to a vehicle that allows a front structure and a rear structure to rotate relative to each other through an elastic unit.

An embodiment of the present disclosure can address the issues described above. An embodiment of the present disclosure can provide stability to the body of a vehicle by implementing tilting that allows relative rotation and return of the front structure and the rear structure through an elastic unit positioned between the front structure including a front wheel of the vehicle and the rear structure including a rear wheel, thereby preventing or reducing vehicle rollovers during turns and drives.

The technical advantages of an embodiment of the present disclosure are not necessarily limited to the aforementioned technical advantages, and other technical advantages not mentioned may be clearly understood by those skilled in the art from the following description.

A body of a vehicle of an embodiment of the present disclosure configured to achieve the above advantages may include: a front structure including a front wheel of the vehicle; a rear structure including a rear wheel of the vehicle; a rotation shaft connecting the front structure and the rear structure and allowing the front structure and the rear structure to rotate relative to each other; and an elastic unit providing a return force in the opposite direction of the relative rotation in response that the front structure and the rear structure rotate relative to each other.

According to an embodiment of the present disclosure, the body of the vehicle may include a single front wheel and a plurality of rear wheels.

In the body of the vehicle of an embodiment of the present disclosure, a front frame may be provided in the front structure, a rear frame may be provided in the rear structure, and the rotation shaft may have one end fixed to either the front frame or the rear frame and the other end rotatably connected to the remaining frame.

In the body of an embodiment of the vehicle of the present disclosure, the elastic unit may include an elastic body storing an elastic force upon compression, and the elastic body may be connected to the front frame or the rear frame and compress in response to the front frame and the rear frame rotation relative to each other.

In the body of an embodiment of the vehicle of an embodiment of the present disclosure, the elastic body may be a spring extending in the width direction of the vehicle and the elastic body may have each end selectively connected to the front frame or the rear frame depending on the relative rotation direction of the front frame and the rear frame.

In the body of an embodiment of the vehicle of the present disclosure, a mounting bracket may be provided in either the front frame or the rear frame, a slit hole may be formed on the mounting bracket, each end of the elastic body may lock into each end of the slit hole respectively, a pair of forks may be provided on the outside of the slit hole in the remaining front frame or rear frame, and the elastic body may be compressed by one of the forks pressing against the end of the elastic body facing the fork in response that the front frame and the rear frame rotate relative to each other.

In the body of an embodiment of the vehicle of the present disclosure, the elastic body may be disposed in the width direction of the vehicle, a locking pin may be coupled to each end of the elastic body, a pair of locking pins can be respectively secured to each end of the slit hole to be supported thereby, and the pair of locking pins may be selectively or simultaneously supported by a pair of forks respectively.

In the body of an embodiment of the vehicle of the present disclosure, a pair of spring cups may be respectively coupled to each end of the elastic body, each spring cup may have one end open toward the elastic body, and the spring cups may be positioned above the pair of forks to be fixed.

In the body of an embodiment of the vehicle of the present disclosure, a coupling notch may be formed in the pair of forks, and the pair of spring cups may be coupled to the mounting bracket through the locking pin in the state of fixedly locking into the coupling notch.

In the body of an embodiment of the vehicle of the present disclosure, an adjustment screw can be formed at one end of the elastic body. The adjustment screw can pass through the spring cup to couple to the elastic body, and the elastic body can be compressed or stretched in its axial direction by the rotation of the adjustment screw so that the elastic force of the elastic body may be adjusted.

In the body of the vehicle of an embodiment of the present disclosure, an adjustment disk may be provided between the elastic body and the spring cup, and the adjustment disk may move in the axial direction of the elastic body together with the adjustment screw in response to the adjustment screw being rotated.

In the body of the vehicle of an embodiment of the present disclosure, the pair of locking pins and the pair of forks may be simultaneously supported in the state where the front frame and the rear frame of the vehicle are aligned straight without rotating relative to each other. The locking pins and forks may be selectively supported in the state where the front frame and rear frame of the vehicle are rotated relative to each other.

In the body of the vehicle of an embodiment of the present disclosure, a tilting brake may be provided between the front structure and the rear structure, and the front structure and the rear structure may not rotate relative to each other in response that the tilting brake is engaged.

In the body of the vehicle of an embodiment of the present disclosure, a stopping protrusion may be provided on the outer circumferential surface of the other end of the rotation shaft and a limiting protrusion base may be provided in the remaining front frame or rear frame. A pair of limiting protrusions may be disposed to face each other at each end of the limiting protrusion base and the stopping protrusion may move between the pair of limiting protrusions so that the relative rotation angle between the front frame and the rear frame may be limited.

In the body of the vehicle of an embodiment of the present disclosure, the limiting protrusion base may have a 'U' shape with an open surface toward the stopping protrusion. The limiting protrusion may be positioned at each end of the limiting protrusion base and the stopping protrusion may come into contact with the limiting protrusion within the open surface of the limiting protrusion base so that limiting the rotation angle may be limited.

In the body of the vehicle of an embodiment of the present disclosure, the limiting protrusion may be a bolt and threads may be formed at both ends of the limiting protrusion base to be bolt-coupled to the limiting protrusion. The rotation angle of the stopping protrusion may be controlled by altering the bolt-coupling of the limiting protrusion.

In the body of the vehicle of an embodiment of the present disclosure, the front structure may include a front body and a front frame and the rear structure may include a rear body and a rear frame.

In the body of the vehicle of an embodiment of the present disclosure, the front body and the front frame may slide up and down and include a front fixing portion configured to fix the relative position to which the front body and the front frame slide. The rear body and the rear frame may slide up and down and include a rear fixing portion configured to fix the relative position to which the rear body and the rear frame slide.

In the body of the vehicle of an embodiment of the present disclosure, a brake handle may be provided in the front structure of the vehicle, and the brake handle may be connected to the tilting brake to engage the tilting brake by manipulating the brake handle.

In the body of the vehicle of an embodiment of the present disclosure, the front structure of the vehicle may include a front seat and the front frame is provided under the front seat. The rear frame is disposed behind the front frame, and the rotation shaft extending in the length direction may be provided between the front frame and the rear frame.

According to the body of the vehicle of an embodiment of the present disclosure, the elastic force of the elastic unit positioned between the front structure including a front wheel and the rear structure including rear wheels may be utilized to implement tilting that allows the relative rotation and return of the front structure and the rear structure, thereby preventing rollover during turns and drives of the vehicle to provide stability.

The advantages obtainable from an embodiment of the present disclosure are not necessarily limited to those mentioned above, and other advantages not mentioned can be clearly understood by those skilled in the art to which the present disclosure pertains.

BRIEF DESCRIPTION OF THE DRAWINGS

FIG. 1 is a perspective view illustrating a stopping protrusion and a limiting protrusion according to an embodiment of the present disclosure.

DETAILED DESCRIPTION OF ILLUSTRATIVE EMBODIMENTS

Figure 1:
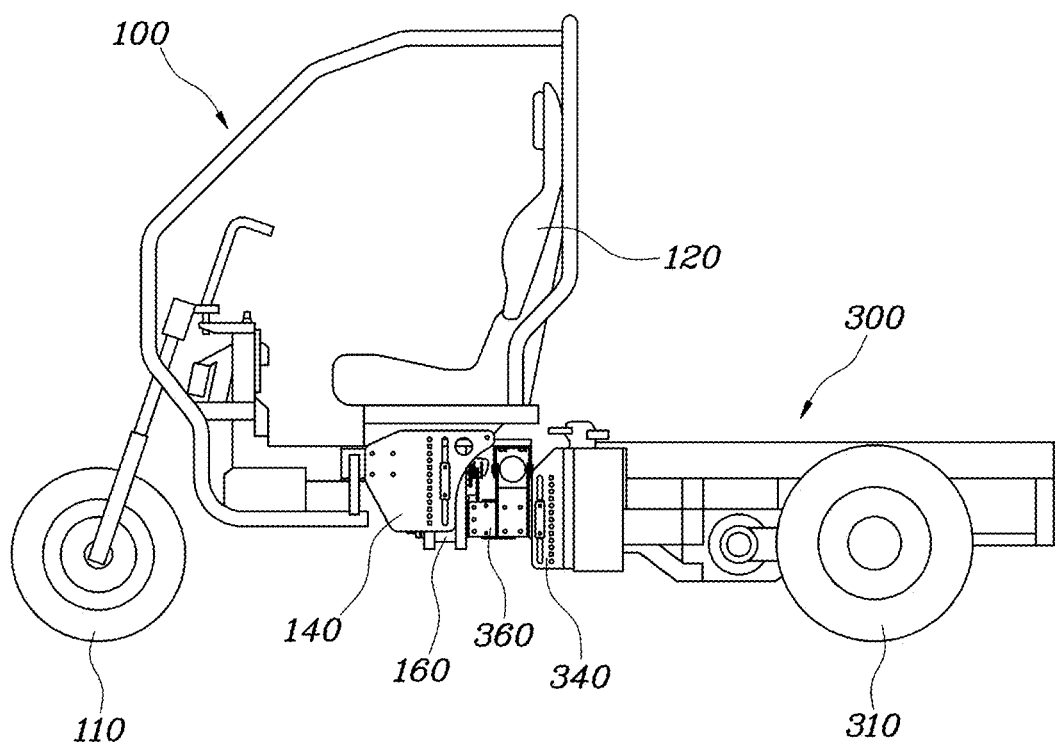
FIG. 1 is a side view illustrating a vehicle including a front structure and a rear structure according to an embodiment of the present disclosure.

When it is determined that a specific description of the related and already known technology may obscure the essence of the example embodiments disclosed herein, the specific description of such can be omitted. It can be understood that the accompanying drawings are only intended to facilitate understanding of the example embodiments disclosed herein and are not intended to necessarily limit the technical ideas disclosed herein, which are not necessarily limited to the accompanying drawings and include modifications, equivalents, or substitutions within the spirit and technical scopes of the present disclosure. The following disclosure is not intended to necessarily limit the present disclosure to the described form or a particular field, and it is considered that various alternative aspects and modifications of the present disclosure, whether explicitly stated or implied herein, can be possible. Those skilled in the art to which the present disclosure pertains can recognize that the forms and details of an embodiment of the present disclosure may be varied.

The present disclosure is described with reference to specific example embodiments. However, as will be understood by those skilled in the art to which the present disclosure pertains, various embodiments described herein may be modified or otherwise implemented in a variety of different ways and still in the spirit and scopes of the present disclosure. Accordingly, the following description is to be considered illustrative and is intended to instruct those skilled in the art to which the present disclosure pertains on methods of making and using various embodiments. The forms of disclosure illustrated and described herein can be taken as typical example embodiments. Equivalent elements, materials, processes, or steps may be substituted for those illustrated and described herein. Terms such as "including", "comprising", "consisting of", "having, and "is" used herein are to be construed in a non-exclusive manner, i.e., the terms are construed to include items, components, or elements not explicitly described. References to the singular can be construed to include references to the plural where appropriate.

Various example embodiments described in the present specification are to be taken as illustrative and explanatory, and not to be construed to necessarily limit the contents of the present disclosure. All references to "joining" (e.g., attached, affixed, coupled, connected, etc.) can be used only to facilitate understanding of the present disclosure and are not to be construed to necessarily limit the position, orientation, or use of the configurations or the methods disclosed in the present specification. Accordingly, when a reference to joining is present, it can be interpreted broadly. Furthermore, such references to joining do not necessarily imply that two or more elements are directly connected to each other. Numerical terms, such as "first", "second", 'third", "primary", "secondary", "major", or any other generic or numerical terms can be used only as identifiers to assist in the understanding of the various components, forms, variations, or modifications of embodiments of the present disclosure and are not intended to necessarily be limitations to any component, form, variation, or modification, or to any necessary order or preference thereof. In other words, these expressions may be used to describe various components, but the components are not necessarily limited by such expressions. The expressions can be used only to distinguish one component from another.

It can be understood that when one component is referred to as being "connected" or "linked" to another component, the component may be directly connected or linked but there may be other components in between. In contrast, when one component is referred to as being "directly connected" or "directly linked" to another component, it can be understood that there are no other components in between.

Any number of components or various components in any configuration among the configurations described in the present specification may be included in the disclosure described in the present specification. The components may include any combination of features described in the present specification and may be arranged in any of the various configurations described in the present specification. The concepts related to the structure and arrangement of the components of an example embodiment of the present disclosure as well as concepts concerning their use and operation may apply to any number of embodiments in any combination as well as the specific example embodiments discussed in the present specification. Example embodiments, including those having various features in various arrangements, will be described below with reference to the drawings.

Figure 2:
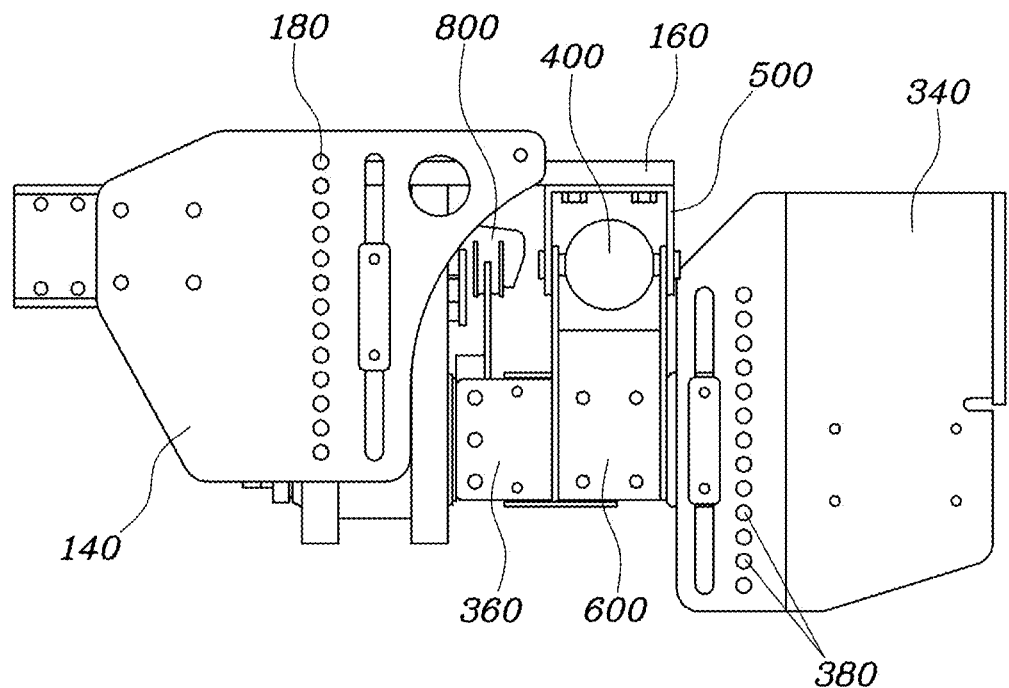
FIG. 2 is a side view illustrating a state of a front body and a front frame, and a rear body and a rear frame according to an embodiment of the present disclosure.
Figure 3:
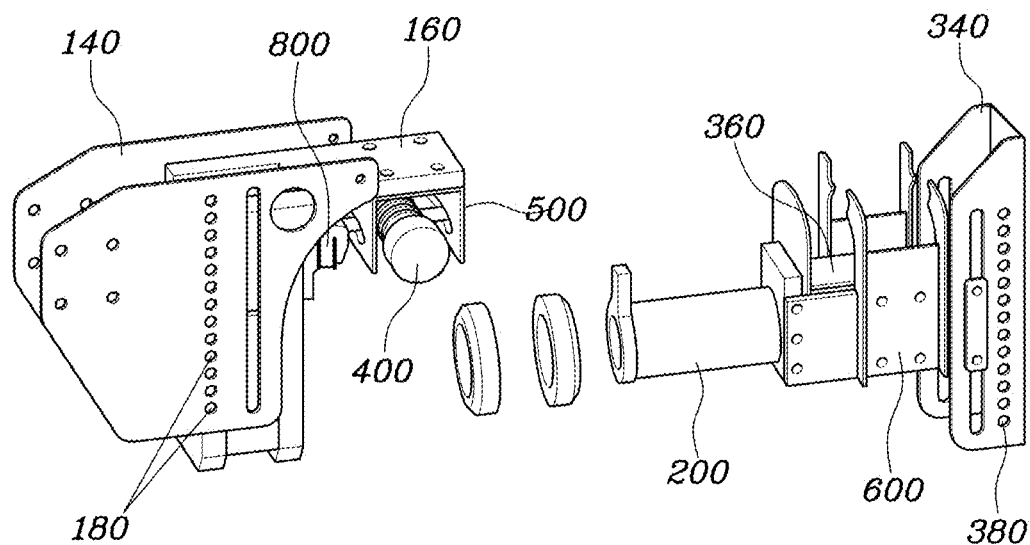
FIG. 3 is an exploded perspective view illustrating structures of the front body and the front frame, and the rear body and the rear frame according to the embodiment illustrated in FIG. 2.
Figure 4:
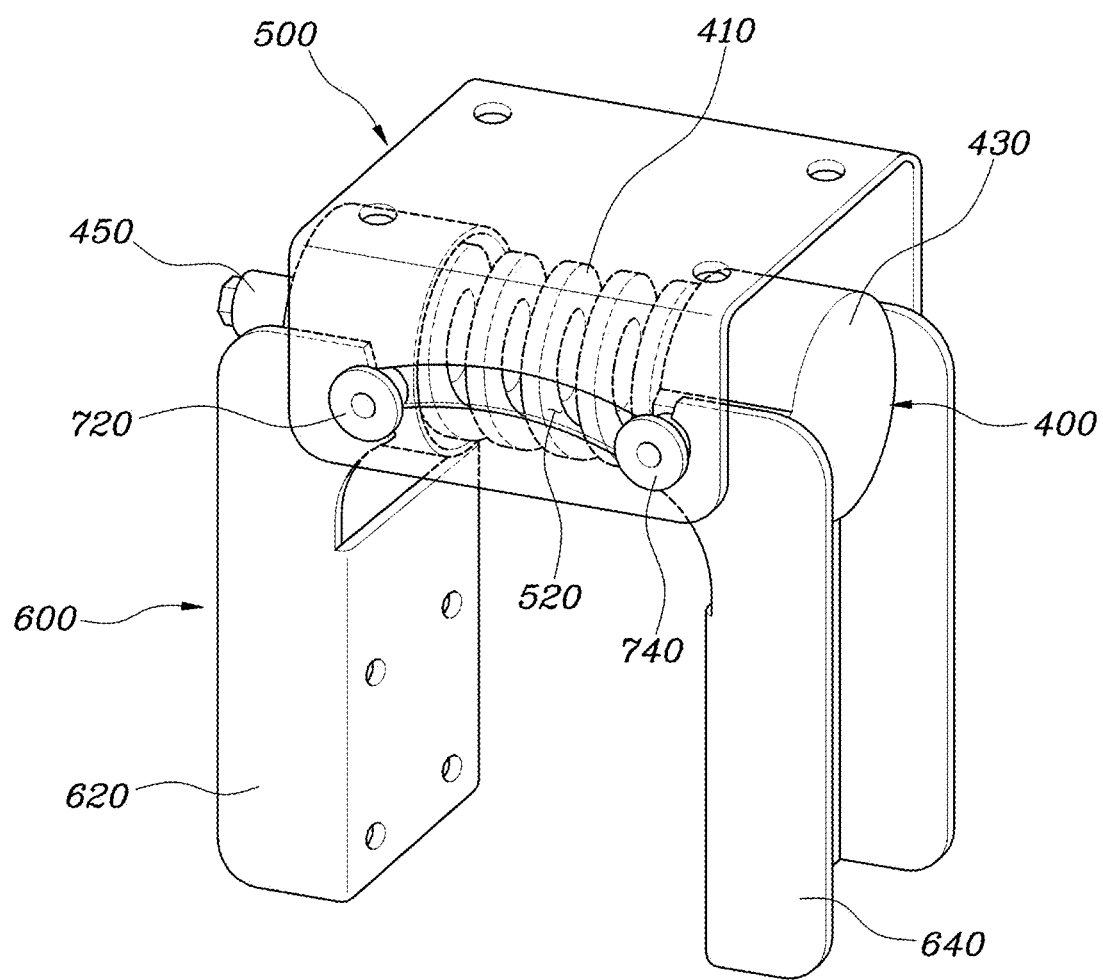
FIG. 4 is a perspective view illustrating a coupled state of an elastic unit, a mounting bracket, locking pins, and forks according to an embodiment of the present disclosure.
Figure 5:
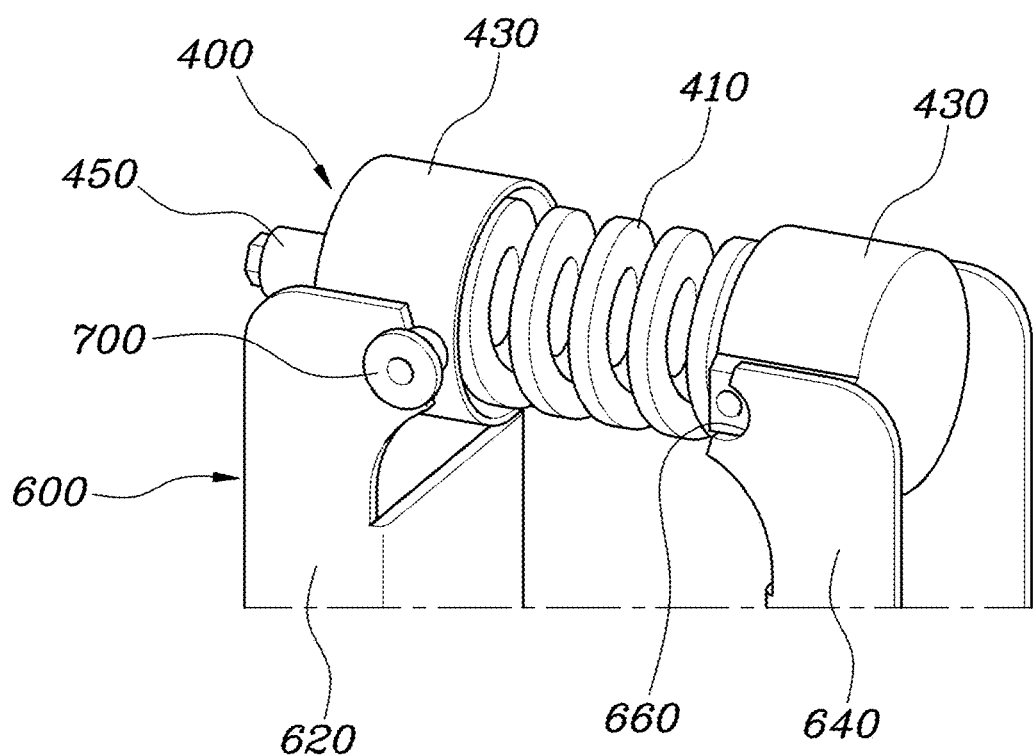
FIG. 5 is a perspective view illustrating a coupled state of the elastic unit, the locking pins, and the forks according to the embodiment illustrated in FIG. 4.
Figure 6:
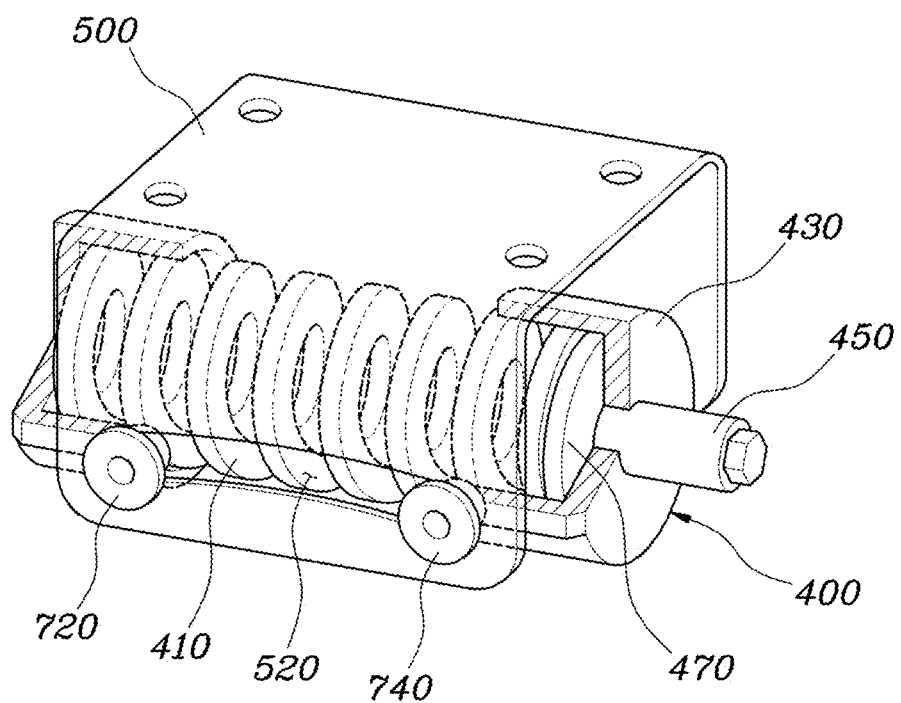
FIG. 6 is a perspective view illustrating an adjustment screw and an adjustment disk of the elastic unit according to the embodiment illustrated in FIG. 4.
Figure 7:
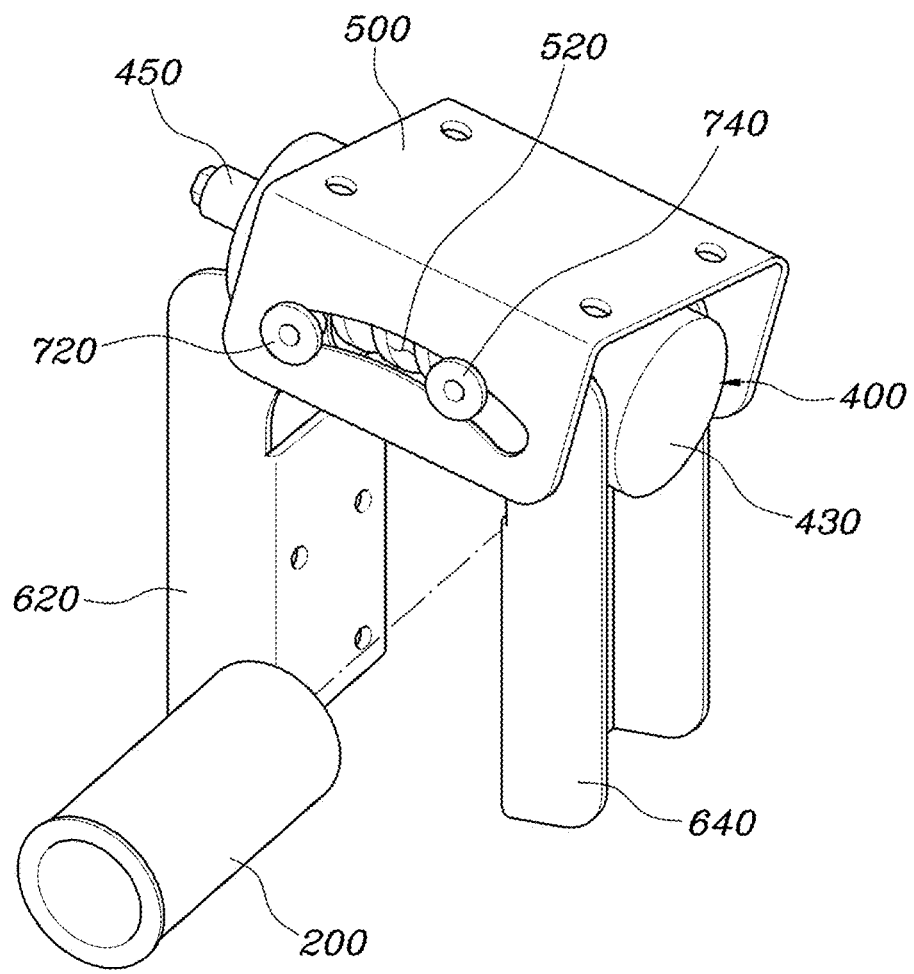
FIG. 7 is a perspective view illustrating a tilted state as the mounting bracket and the locking pin move caused by the compression of the elastic unit according to the embodiment illustrated in FIG. 4.
Figure 8:
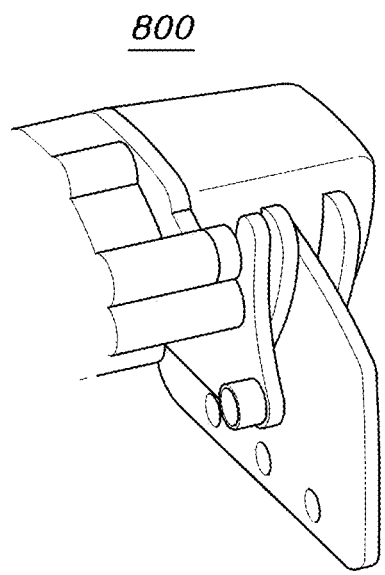
FIG. 8 is a perspective view illustrating a tilting brake according to an embodiment of the present disclosure.
Figure 9:
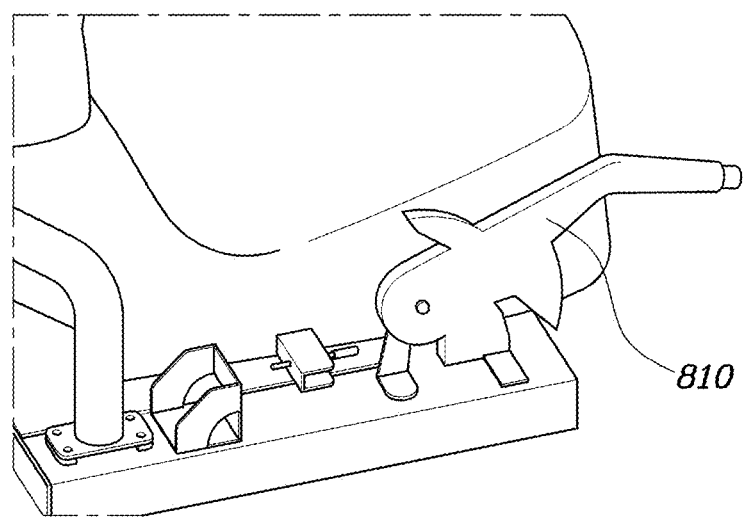
FIG. 9 is a perspective view illustrating a brake handle according to an embodiment of the present disclosure.
Figure 10:
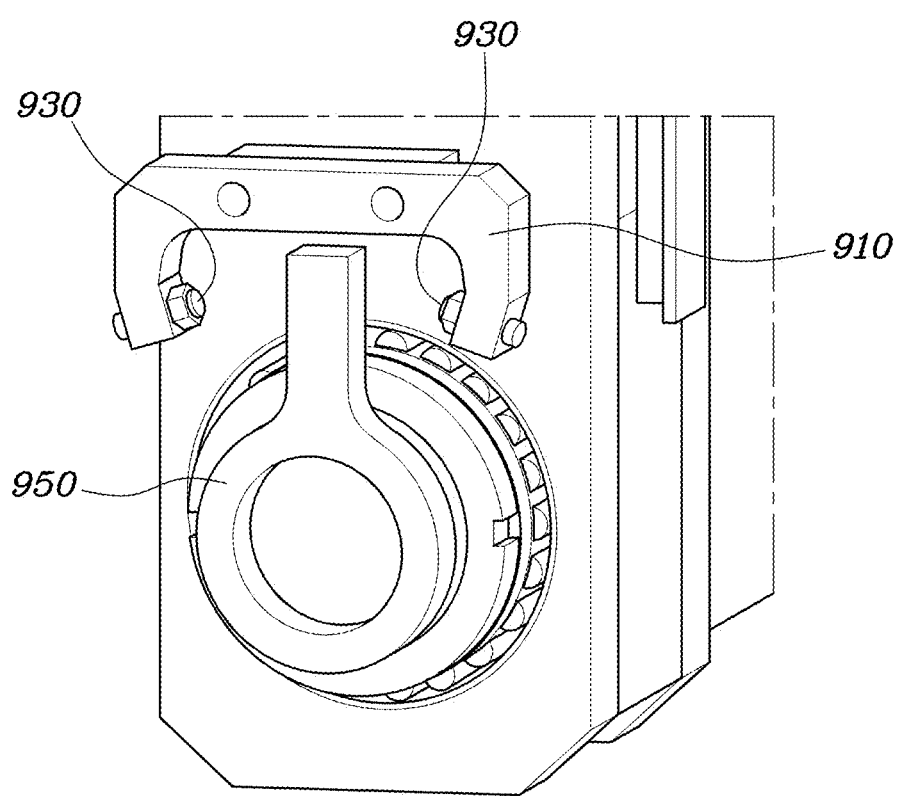
Figure 11:
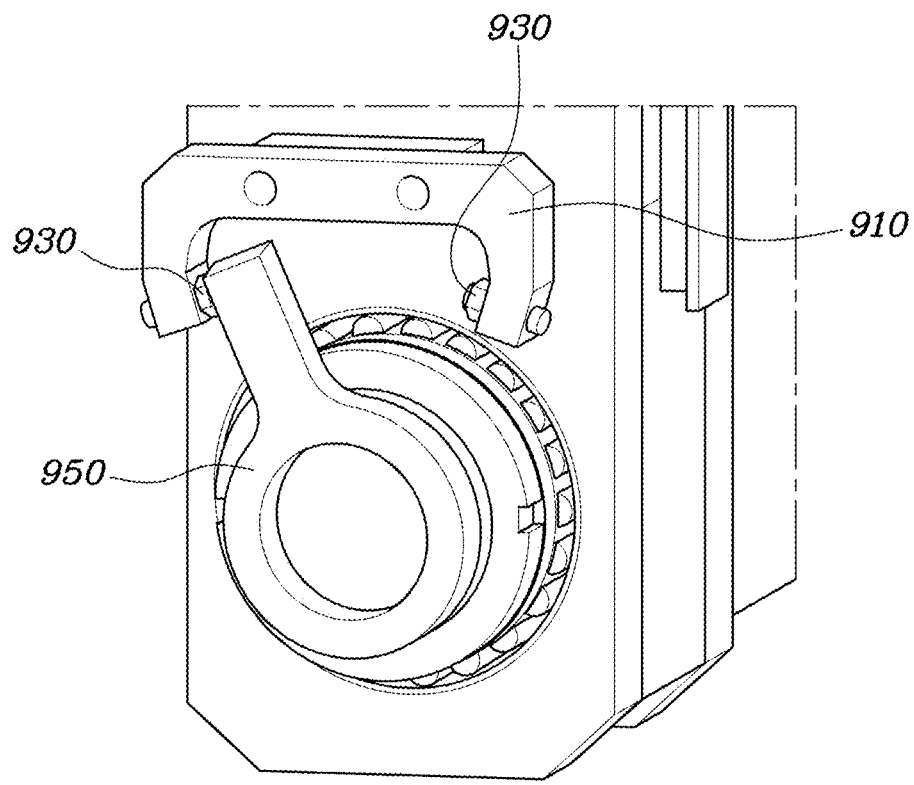
FIG. 11 is a perspective view illustrating a state in which the rotation angle of the stopping protrusion is adjusted by the limiting protrusion according to the embodiment illustrated in FIG. 10.
Figure 12:
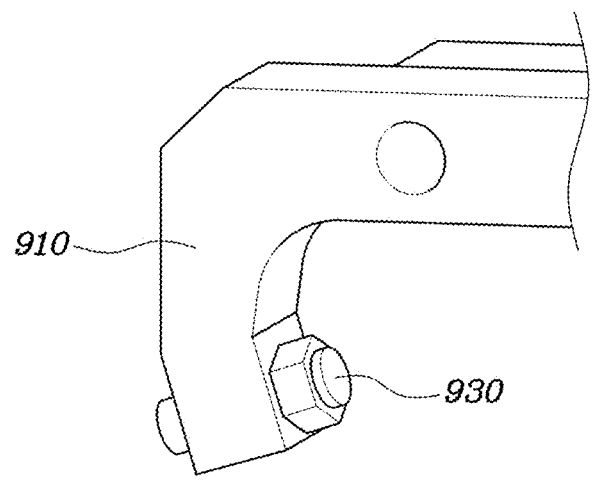
FIG. 12 is a perspective view illustrating the limiting protrusion according to the embodiment illustrated in FIG. 10.
Figure 13:
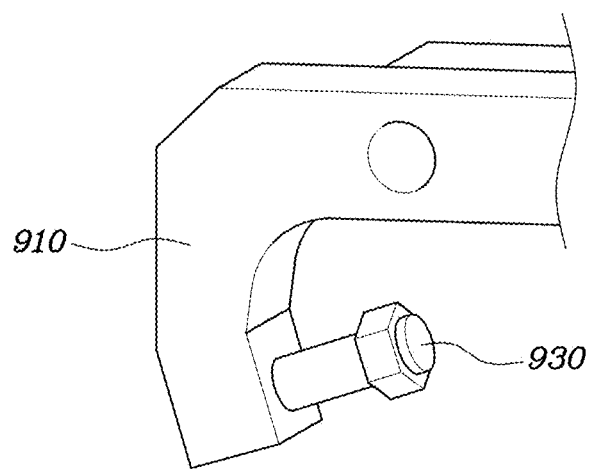
FIG. 13 is a perspective view illustrating a state in which the length of the limiting protrusion is adjusted according to the embodiment illustrated in FIG. 12.
Figure 14:
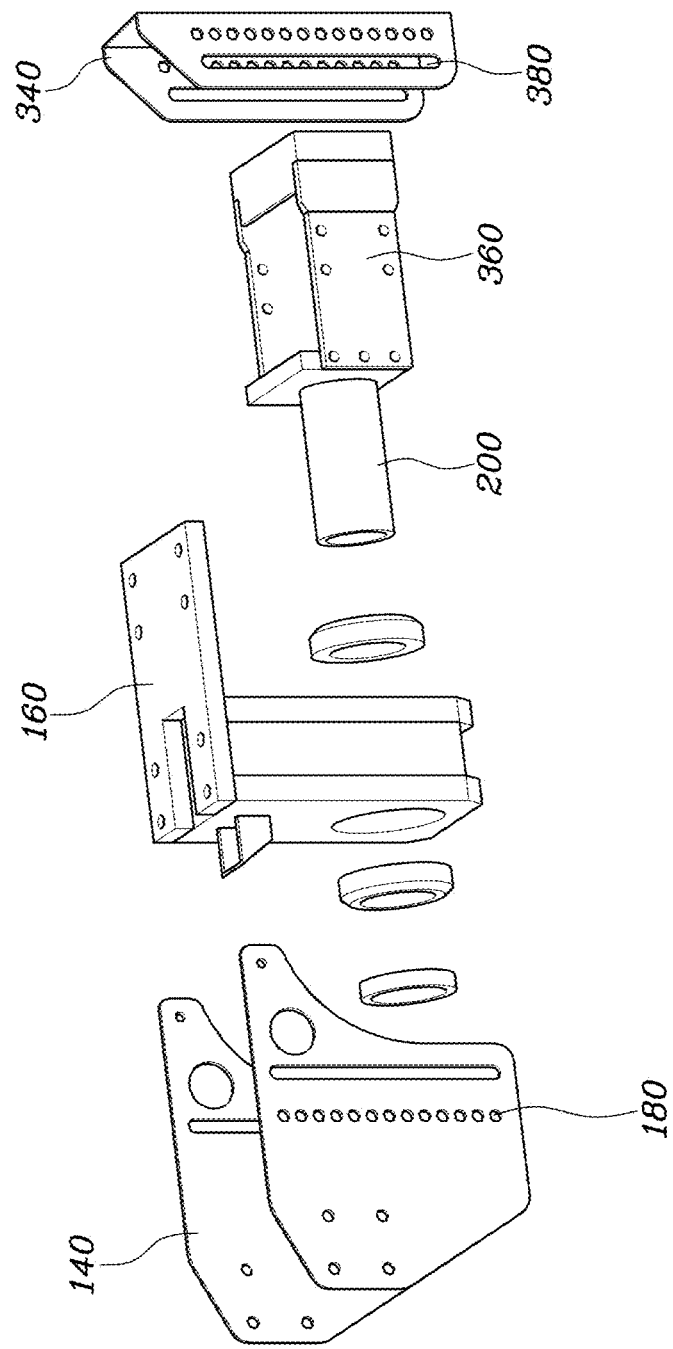
FIG. 14 is an exploded perspective view illustrating a coupling structure of a front body and a front frame, a rear body and a rear frame, and a rotation shaft according to an embodiment of the present disclosure.
Figure 15:
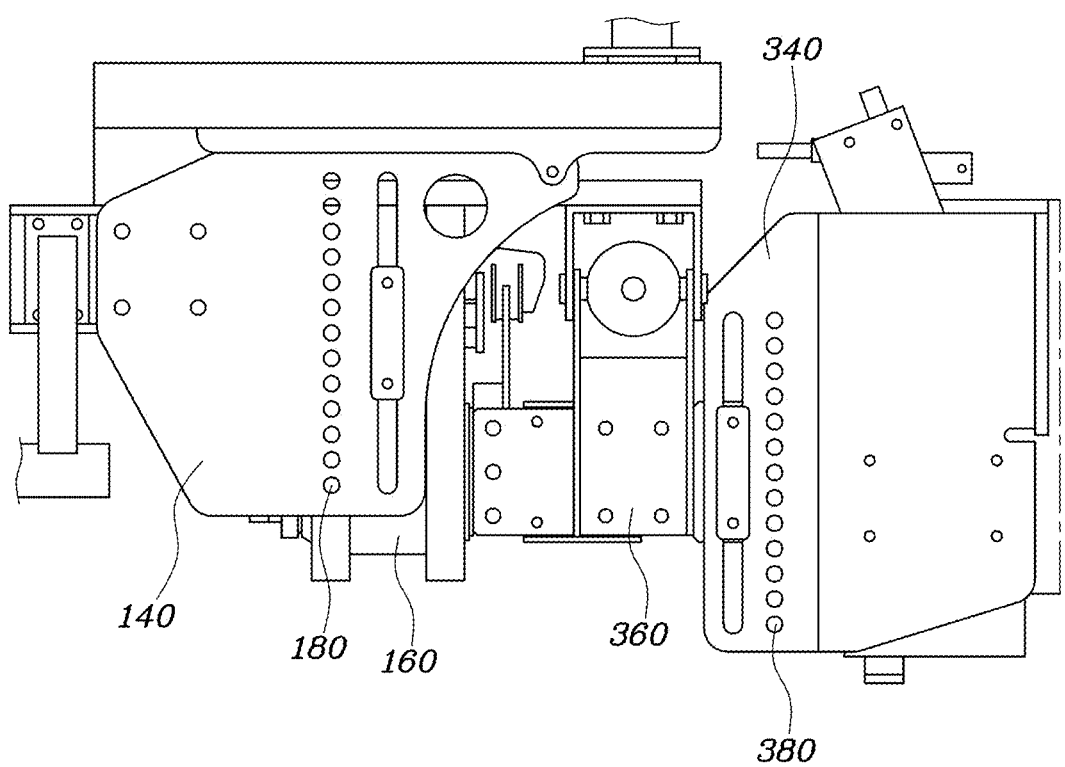
FIG. 15 is a side view illustrating a vertically slidable state of a front body and a front frame, and a rear body and a rear frame according to an embodiment of the present disclosure.
Figure 16:
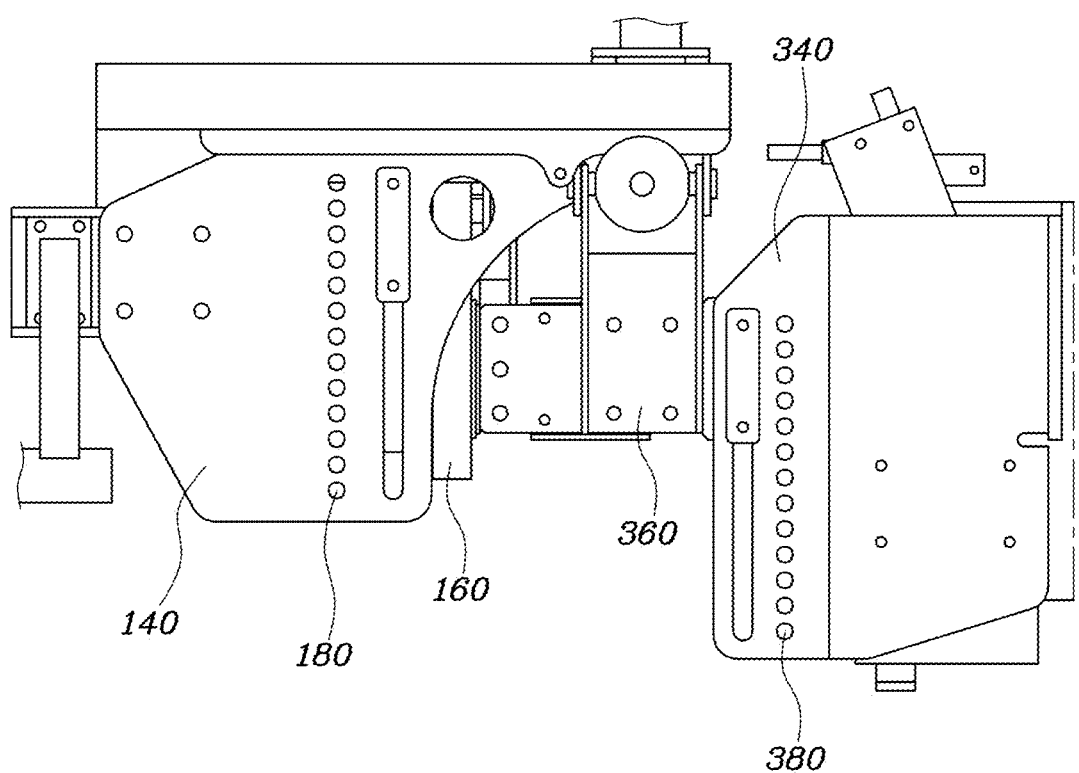
FIG. 16 is a side view illustrating a coupled state of a front body and a front frame, and a rear body and a rear frame at the highest point by a front fixing portion and a rear fixing portion according to the embodiment illustrated in FIG. 15.
Figure 17:
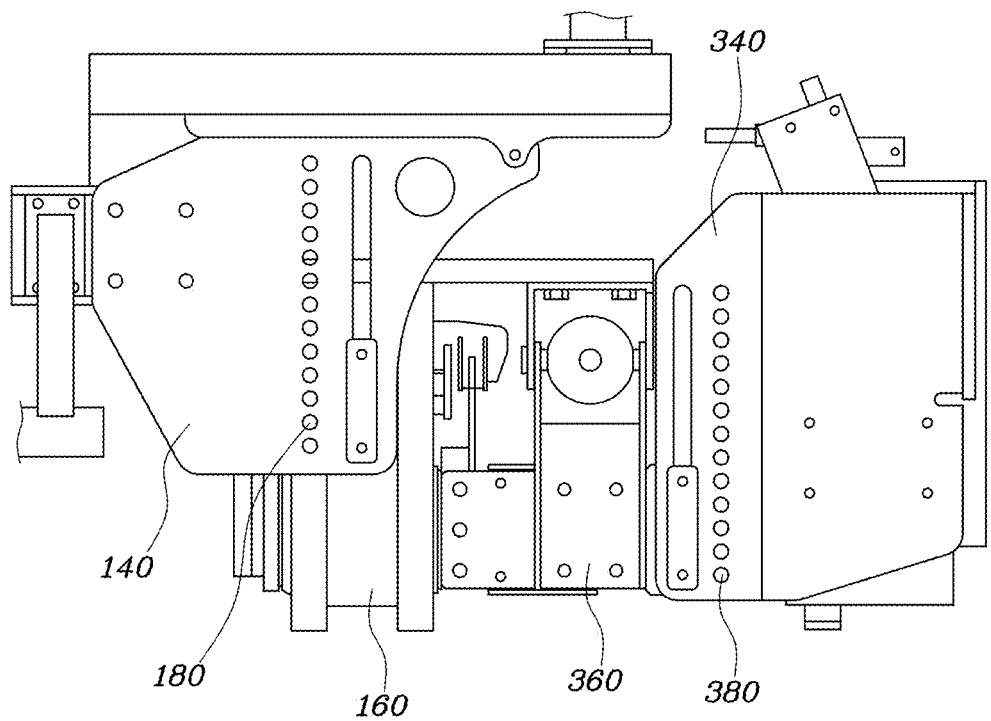
FIG. 17 is a side view illustrating a coupled state of the front body and the front frame, and the rear body and the rear frame at the lowest point by the front fixing portion and the rear fixing portion according to the embodiment illustrated in FIG. 15.
Figure 18:
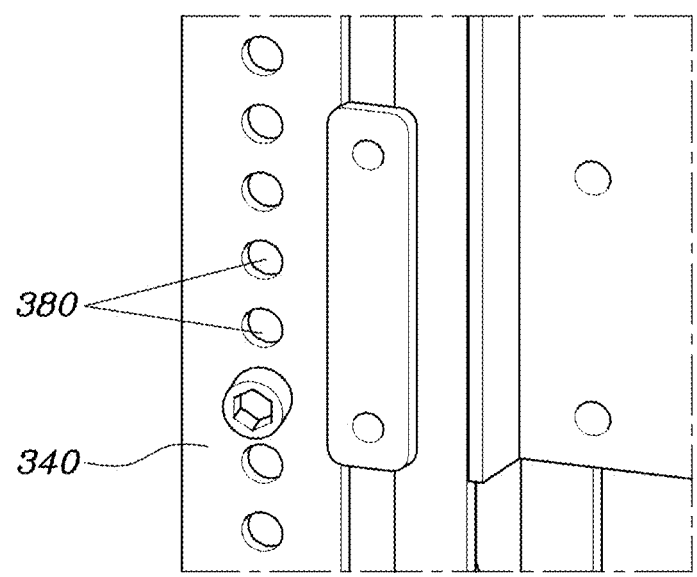
FIG. 18 is a zoomed view illustrating a sliding structure between the bodies and frames and fixing portions illustrated in FIG. 15.

FIG. 1 is a side view illustrating a vehicle including a front structure and a rear structure according to an embodiment. FIG. 2 is a side view illustrating a coupled state of a front body and a front frame, and a rear body and a rear frame according to an embodiment. FIG. 3 is an exploded perspective view illustrating structures of the front body and the front frame, and the rear body and the rear frame according to the embodiment illustrated in FIG. 2. FIG. 4 is a perspective view illustrating a coupled state of an elastic unit, a mounting bracket, locking pins, and forks according to an embodiment. FIG. 5 is a perspective view illustrating a coupled state of the elastic unit, the locking pins, and the forks according to the embodiment illustrated in FIG. 4. FIG. 6 is a perspective view illustrating an adjustment screw and an adjustment disk of the elastic unit according to the embodiment illustrated in FIG. 4. FIG. 7 is a perspective view illustrating a tilted state as the mounting bracket and the locking pin move caused by the compression of the elastic unit according to the embodiment illustrated in FIG. 4. FIG. 8 is a perspective view illustrating a tilting brake according to an embodiment. FIG. 9 is a perspective view illustrating a brake handle according to an embodiment. FIG. 10 is a perspective view illustrating a stopping protrusion and a limiting protrusion according to an embodiment. FIG. 11 is a perspective view illustrating a state in which the rotation angle of the stopping protrusion is adjusted by the limiting protrusion according to the embodiment illustrated in FIG. 10. FIG. 12 is a perspective view illustrating the limiting protrusion according to the embodiment illustrated in FIG. 10. FIG. 13 is a perspective view illustrating a state in which the length of the limiting protrusion is adjusted according to the embodiment illustrated in FIG. 12. FIG. 14 is an exploded view illustrating a coupling structure of a front body and a front frame, a rear body and a rear frame, and a rotation shaft according to an embodiment. FIG. 15 is a side view illustrating a vertically slidable state of a front body and a front frame, and a rear body and a rear frame according to an embodiment. FIG. 16 is a side view illustrating a coupled state in which a front body and a front frame, and a rear body and a rear frame, are coupled at the highest point by a front fixing portion and a rear fixing portion according to the embodiment illustrated in FIG. 15. FIG. 17 is a side view illustrating a coupled state of the front body and the front frame, and the rear body and the rear frame, at the lowest point by the front fixing portion and the rear fixing portion according to the embodiment illustrated in FIG. 15. FIG. 18 is a zoomed view illustrating a sliding structure between the bodies and frames and fixing portions illustrated in FIG. 15.

Hereinafter, various example embodiments disclosed in the present specification will be described in detail with reference to the accompanying drawings. Identical or similar components can be assigned same reference numerals regardless of drawing designation, and repetitive descriptions thereof can be omitted.

Small or three-wheeled vehicles can be highly popular in urban areas worldwide for several advantages such as maneuverability and fuel efficiency. In particular, these vehicles often adopt low-cost suspension systems to reduce manufacturing costs and simplify maintenance. However, these low-cost suspension systems often come with design and performance limitations, which may adversely impact the vehicle's driving stability. In particular, the center of gravity of the vehicle may shift to one side during turns, significantly increasing the risk of rollover accidents.

In particular, small three-wheeled vehicles driven in Southeast Asia often suffer from an unstable center of gravity due to their structure, which typically features a front tire positioned in the center, a battery placed under the front seat, and the motor positioned between the rear wheels. In addition, some factors can exacerbate the problem, such as routine overloading and overoccupancy when using vehicles as well as wheelbase compression during braking due to the adoption of low-cost front-wheel suspension systems.

Accordingly, an embodiment of the present disclosure can provide a technical solution for effectively reducing the risk of rollovers even in vehicles adopting a low-cost suspension system. More specifically, in a vehicle comprising a front structure 100 in which the cabin is formed and a rear structure 300 in which a cargo area is formed, an elastic unit 400 can be positioned between the front structure 100 and the rear structure 300 and can cause the relative rotation and return of the front structure and the rear structure so that more stable driving is made possible when the vehicle turns in the lateral direction.

First, vehicles to which an embodiment of the present disclosure applies will be described with reference to FIG. 1.

An embodiment of the present disclosure can relate to a tilting device configured to prevent or hinder a rollover when a small vehicle turns, and can aim to enhance driving stability during turns in a vehicle divided into the front structure 100 and the rear structure 300. In this case, the front structure 100 may refer to a space including the vehicle's front wheel 110 and a front seat 120, and the rear structure 300 may refer to a space accommodating the vehicle's rear wheels 310 and rear seat or cargo area. In particular, the rear structure 300 may be a cargo area configured to load cargo thereon or therein, a passenger compartment configured to accommodate passengers thereon or therein, or a space accommodating a lift ramp or foldable ramp configured to load and unload mobility devices such as wheelchairs or bicycles.

On the other hand, an embodiment of the present disclosure can pertain to a structural design to improve the driving stability of a three-wheeled vehicle that features a single front wheel 110 and a plurality of rear wheels 310. The front structure 100 may include a steering mechanism and a braking system connected to the front wheel 110. The front structure 100 may have a front seat 120 for a single driver or a front seat 120 for more than one person, including a passenger seat. The frame of the front structure 100 may be made of metal pipes or the like and may include auxiliary components such as a windshield and side view mirrors. Furthermore, the three-wheeled vehicle may include a front-wheel height adjustment device to allow independent height adjustment from the rear structure 300. A suspension system connecting the front wheel 110 to the vehicle body, and lighting devices, may be further incorporated.

A battery may be provided under the front seat 120 of the front structure 100 to supply power to the vehicle's drive device. Because the battery can be positioned under the front seat 120, the height of the front seat 120 can be inevitably increased to raise the vehicle's center of gravity such that a tilting device may reduce the risk of rollover during turns.

On the other hand, the rear structure 300 of an embodiment of the present disclosure may be a space serving various purposes. Although the following description will use a cargo bed as an example, this is merely one embodiment. The rear structure may be utilized as a multi-purpose space such as a passenger compartment configured to accommodate passengers, a space equipped with a lifting device configured to lift mobility devices, such as wheelchairs or bicycles, or a space equipped with a stretcher for a patient or injured individual.

The rear structure 300 may include a plurality of wheels differing from the front wheel, and a drive device may be provided between the rear wheels. The drive device typically can refer to an engine or a motor. However, the drive device is not limited to the aforementioned embodiment but may include various types of drive devices such as a hydraulic drive device, a pneumatic drive device, and the like. The drive device may also include a transmission, a rear wheel suspension system, a braking system, a light device, and the like.

While the following description of example embodiments of the present disclosure is premised on the application to a three-wheeled vehicle as described above, this is merely an illustrative example. This technology may apply to various types of vehicles such as four-wheeled vehicles, small vehicles, or multi-purpose vehicles, where a relative rotation between the front structure 100 and the rear structure 300 can be useful due to the risk of rollover during turns.

Next, the body of a vehicle according to an embodiment of the present disclosure will be described with reference to FIGS. 1 to 3.

In an embodiment, the vehicle may include the front structure 100 including a front wheel 110 and the rear structure 300 including the rear wheels 310. The front structure 100 and the rear structure 300 may be connected to each other and rotate relative to each other at the same time through a rotation shaft 200. The elastic unit 400 may be included to provide a return force in the opposite direction of the relative rotation when the front structure 100 and the rear structure 300 rotate relative to each other along a longitudinal axis extending through the rotation shaft 200, wherein for context the longitudinal axis can extend from a front of the vehicle towards the back of the vehicle, for example. Accordingly, in an embodiment, the vehicle can be designed to allow relative rotation of the front structure 100 and the rear structure 300 so that the rollover risk may be reduced when the vehicle turns using the rotating force of the rotation shaft 200 and the return force of the elastic unit 400.

In an embodiment, the front structure 100 of the vehicle may include at least one of or any combination of a steering mechanism, a braking system, or a front seat 120, and the rear structure 300 may include at least one of or any combination of a rear seat, a cargo box, or a drive device. More specifically, the steering mechanism can control the vehicle's traveling direction and may include a steering wheel, a steering link, and the like. The braking system can reduce the speed of or stop the vehicle and may include a brake pedal or a hand brake. The drive device can include an engine, transmission, gears, and the like, and may be structured to deliver power to the wheels.

In an embodiment, the body of the vehicle applicable to a three-wheeled vehicle may have two front wheels 110 and one rear wheel 310, or one front wheel 110 and two rear wheels 310. In a three-wheeled vehicle with two front wheels 110 and one rear wheel 310, the steering mechanism may be connected to the two front wheels, brakes may be mounted on the front wheel 110 and the rear wheel 310 respectively, and a rear-wheel drive system where the driving force of the drive device is delivered to the rear wheel 310 may be adopted. In contrast, a three-wheeled vehicle with one front wheel 110 and two rear wheels 310 may adopt a front wheel drive system where the steering mechanism is connected to the single front wheel 110 and the driving force of the drive device is delivered to the front wheel 110. However, these are merely illustrative examples, and an embodiment of the present disclosure can be applicable to vehicles with various types of steering, braking, and drive devices in general.

In an embodiment, as illustrated in FIG. 3, a front body 140 and a front frame 160 may be provided in the front structure 100, and a rear body 340 and a rear frame 360 may be formed in the rear structure 300. The front body 140 and the front frame 160, and the rear body 340 and the rear frame 360 may be connected to each other through the rotation shaft 200, and an angle adjustment device 950, 930 adjusting the rotation angle of the rotation shaft 200 and a tilting brake 800 controlling the rotation may be formed.

More specifically, in an embodiment, the rear body 340 may be included in the rear structure 300 and the rear body 340 may connect to the rear frame 360 from behind. A battery may be provided under the front seat 120 and the battery may provide power to the drive device of the vehicle. The drive device may be provided under the rear body 340 to supply the driving force to the rear wheels 310 of the vehicle.

In an embodiment, each configuration may be connected by bearings to allow efficient rotation of the rotation shaft 200 while reducing wear and friction and supporting the load. However, the front structure 100 and the rear structure 300 may be connected through various configurations in addition to the bearings.

Next, the relative rotation through the elastic unit 400 of an embodiment of the present disclosure will be described with reference to FIGS. 4 to 7.

In an embodiment, the elastic unit 400 may be an elastic body 410 configured to store an elastic force upon compression. As illustrated in FIGS. 2 and 3, the elastic body 410 may be connected to the front frame 160 or the rear frame 360 and compress when the front frame 160 and the rear frame 360 rotate relative to each other.

More specifically, in an embodiment, the elastic body 410 may be a spring extending in the width direction of the vehicle. The elastic body 410 may be selectively connected to the front frame 160 or the rear frame 360 depending on the relative rotation direction of the front frame 160 and the rear frame 360, for example. In this example, the connection of the elastic body 410 to the frames 160, 360 may be made possible through a mounting bracket 500. A slit hole 520 may be formed in the mounting bracket 500, each end of the elastic body 410 may respectively lock into each end of the slit hole 520, and a pair of forks 620, 640 may be provided on the outside of the slit hole 520 in the remaining front frame 160 or rear frame 360. As a result, the elastic body 410 can be compressed toward the second fork 640 by the first fork 620 pressing against the end of the elastic body 410 facing the first fork 620 when the front frame 160 and the rear frame 360 rotate relative to each other so that the front structure 100 and the rear structure 300 may rotate relative to each other.

As illustrated in FIGS. 5 and 6, in an embodiment, a spring cup 430 configured to support the elastic body 410 may be coupled to each end of the elastic body 410. The spring cup 430 may be shaped to encase the end of the elastic body 410, and the elastic body 410 may be supported through the spring cup 430 and compress toward one end of the two ends on the pair of forks 620, 640. The spring cup 430 may be molded with a material having sufficient stiffness to support the elastic body 410. The spring cup 430 may be positioned above the pair of forks 620, 640 to be coupled thereto. A coupling notch 660 may be formed in the pair of forks 620, 640, and the spring cup 430 may be fixed through a locking pin 700 in the state of fixedly locking into the coupling notch 660. As a result, the elastic body 410 may be supported by the pair of forks 620, 640 in the state where the elastic body 410 remains in a coupled state to the spring cup 430 so that the elastic body 410 may compress toward one end when the front frame 160 and the rear frame 360 rotate relative to each other.

On the other hand, in an embodiment, an adjustment disk 470 may be included at a boundary point between the elastic body 410 and the spring cup 430. The adjustment disk 470 may be coupled to the elastic body 410 through an adjustment screw 450. The initial elastic force of the elastic body 410 may be adjusted by preloading the elastic force of the elastic body 410 through the adjustment screw 450. For example, when the elastic force of the elastic body 410 is adjusted to be strong through the adjustment screw 450, the relative rotation and return of the front frame 160 and the rear frame 360 may be performed somewhat stiff and rigidly (more spring force), while when the elastic force is adjusted to be weak, the relative rotation and return of the front frame 160 and the rear frame 360 may be performed smoothly and weakly (less spring force). Driving comfort may be properly fine-tuned to match the ground surface of the traveling road by altering the elastic force through the adjustment screw 450 and the adjustment disk 470.

In an embodiment, the elastic body 410 may be disposed in the width direction of the vehicle, and the locking pin 700 can be coupled to each end of the elastic body 410 to fix the elastic body 410. In this example, the locking pin 700 may be directly coupled to the elastic body 410, or the spring cup 430 may be formed at each end of the elastic body 410 to couple the locking pin 700 to the spring cup 430. The pair of locking pins 720, 740 may be secured to each end of the slit hole 520 of the mounting bracket 500 to be supported thereby. The slit hole 520 of the mounting bracket 500 may have the shape of a hand fan extending in the length direction of the elastic body 410, and matching slit holes may be made on both sides of the elastic body 410. The pair of locking pins 720, 740 can be respectively supported by each end of the slit hole 520 so that the pair of locking pins 720, 740 may be selectively or simultaneously supported by each of the pair of forks 620, 640 respectively.

More specifically, in an embodiment, the pair of locking pins 720, 740 formed on one side of the elastic body 410 may move independently of each other. For example, as illustrated in FIG. 7, when the front frame 160 and the rear frame 360 rotate relative to each other with respect to the rotation shaft 200, the elastic body 410 can compress in the state where the pair of forks 620, 640 remains fixed so that the elastic body 410 may compress in the relative rotation direction of the mounting bracket 500 and the locking pin 700. In this example, the first locking pin 720 moves in the relative rotation direction so that the first locking pin 720 can disengage from the first fork 620 while the second locking pin 740 remains engaged with the second fork 640.

In an embodiment, in the state where the front frame 160 and the rear frame 360 remain aligned straight without rotating relative to each other, the pair of locking pins 720, 740 and the pair of forks 620, 640 may be supported simultaneously as illustrated in FIG. 4. In contrast, in the state where the front frame 160 and the rear frame 360 rotate relative to each other, the first locking pin 720 and the first fork 620 may selectively support each other as illustrated in FIG. 7. In this example, the second locking pin 740 and the second fork 640 can remain fixed so that the elastic body 410 may compress toward the supported side. For example, when the vehicle turns left, the elastic body 410 can compress leftward so that the first locking pin 720 may disengage from the first fork 620 and compress toward the second locking pin 740. In such state, the second locking pin 740 can remain coupled to the second fork 640 so that the elastic body 410 may be compressed by the first locking pin 720.

Next, a tilting brake 800 in the body of the vehicle will be described with reference to FIGS. 8 and 9.

In an embodiment, a tilting brake 800 may be provided between the front structure 100 and the rear structure 300. When the tilting brake 800 is engaged, the tilting brake 800 can brake, slow, hinder, or prevent the front structure 100 and the rear structure 300 from rotating relative to each other. The front structure 100 and the rear structure 300 may rotate relative to each other and return to their original position through the rotation shaft 200 disposed in between, and the relative rotation can be controllable according to the vehicle's turn angle. The tilting brake 800 can be provided to limit the relative rotation of the front structure 100 and the rear structure 300 to a preferred, desired, or required level and/or fix the structures in desired positions.

In an embodiment, as illustrated in FIG. 8, the tilting brake 800 may include a metallic brake disk and disk pads clamping the brake disk on both sides to generate friction. A caliper may be further incorporated to press the brake pads against the brake disk, and a hydraulic device may be used to generate hydraulic pressure configured to generate brake pressure.

In an embodiment, the tilting brake 800 may be connected to a brake handle 810 disposed on the side of the front seat 120 formed in the front structure 100. The tilting brake 800 may be engaged by a driver manipulating the brake handle 810 to fix the relative rotation position and control the level of relative rotation of the front structure 100 and the rear structure 300.

In an embodiment, the brake handle 810 may be a lever positioned beside the driver's seat as illustrated in FIG. 9, or, although not illustrated, may be a pedal operated by the driver's foot, for example. The tilting brake 800 and the brake handle 810 may be connected to each other by a cable. However, this is merely an illustrative example, and various forms of tilting brake 800 and brake handle 810 may be considered. Through these, the relative rotation and the return position of the front structure 100 and the rear structure 300 may be fixed and/or adjusted.

FIGS. 10 to 13 are views for describing a limiting protrusion base 910, a stopping protrusion 950, and a limiting protrusion 930 in an embodiment according to the present disclosure.

In an embodiment, a stopping protrusion 950 may be provided on the outer circumferential surface of the rotation shaft 200 coupled to either the front structure 100 or the rear structure 300 and a limiting protrusion base 910 may be provided in the remaining front frame 160 or rear frame 360. A pair of limiting protrusions 930 can be respectively disposed to face each other on each end of the limiting protrusion base 910, and the stopping protrusion 950 can move between the pair of limiting protrusions 930 so that the relative rotation angle of the front frame 160 and the rear frame 360 may be limited.

In this example, the limiting protrusion base 910 may have a 'U' shape with an open surface toward the stopping protrusion 950, the limiting protrusion 930 may be positioned on each end of the limiting protrusion base 910, and the stopping protrusion 950 can come into contact with the limiting protrusion 930 inside the open surface of the limiting protrusion base 910 so that the rotation angle may be limited.

The limiting protrusion 930 may be formed as a bolt. In this example, threads may be formed at both ends of the limiting protrusion base 910 to allow bolt-coupling to the limiting protrusion 930. The head of the limiting protrusion 930 may protrude toward the stopping protrusion 950 by altering the degree of bolt-coupling of the limiting protrusion 930 during bolt-coupling so that the rotation angle of the stopping protrusion 950 may be adjusted wider or narrower.

In this example, a pair of limiting protrusions 930 coming into contact with the stopping protrusion 950 to limit the rotation angle of the stopping protrusion 950 may be formed at a distance from each other in the remaining front frame 160 or rear frame 360. The stopping protrusion 950 can move between the pair of limiting protrusions 930 so that the relative rotation angle of the front frame 160 and the rear frame 360 may be limited.

More specifically, in an embodiment, as illustrated in FIGS. 10 and 11, the stopping protrusion 950 may have a rod extending upward from its connection point to the bearing. The limiting protrusion 930 may be coupled to each end of a U-shaped mount positioned above the rod-shaped stopping protrusion 950. The limiting protrusion 930 may be coupled to the mount in the shape of a bolt-and-nut configuration and have a urethane-based portion that comes into contact with the stopping protrusion 950 to minimize damage upon contact with the stopping protrusion 950. As a result, the stopping protrusion 950 can rotate between the pair of limiting protrusions 930 to determine the rotation angle of the rotation shaft 200 so that the relative rotation and restoration angle of the front structure 100 and the rear structure 300 may be determined.

In the embodiment of FIGS. 12 and 13, the rotation angle of the stopping protrusion 950 may be adjusted by altering the screwing amount of the limiting protrusion 930. In general, considering the angle required for vehicle turns, a preferable screwing amount of the limiting protrusion 930 may be 13° to 22°. This method is merely an illustrative example based on the illustrated embodiment, and various types of limiting protrusions 930, such as a sliding or adhesive device, may be used in addition to the bolt screw device such that the rotation angle of the rotation shaft 200 can be adjusted.

Height adjustment of an embodiment of the present disclosure will be described with reference to FIGS. 14 to 18.

In an embodiment, the front structure 100 may include the front body 140 and the front frame 160, and the rear structure 300 may include the rear body 340 and the rear frame 360. The height of the front structure 100 and the rear structure 300 may be adjusted to enhance driving stability during turns by applying the optimal relative rotation and return position. Accordingly, the front body 140 and the front frame 160 may slide up and down and include a front fixing portion 180 configured to fix the relative position to which the front body 140 and the front frame 160 slide. Similarly, the rear body 340 and the rear frame 360 may slide up and down and include the rear fixing portion 380 configured to fix the relative position to which the rear body 340 and the rear frame 360 slide.

In an embodiment, the front fixing portion 180 and the rear fixing portion 380 may be configured as holes formed in the front body 140 and the rear body 340, respectively. More specifically, a plurality of holes may be formed at a vertical distance from each other to adjust the height and a sliding slit may be formed beside the front fixing portion 180 or the rear fixing portion 380 configured to slide the front frame 160 or the rear frame 360. The sliding slit can extend in the direction in which the front fixing portion 180 and the rear fixing portion 380 can be formed to allow the front frame 160 or the rear frame 360 to slide up and down.

In an embodiment, the front frame 160 or the rear frame 360 may have matching front fixing portion 180 or rear fixing portion 380 and sliding slits at points facing each other across the width of the vehicle. As a result, the front frame 160 or the rear frame 360 may be coupled to the front body 140 or the rear body 340 respectively to adjust heights.

In an embodiment, as illustrated in FIG. 18, the front body 140 and the front frame 160, or the rear body 340 and the rear frame 360 may be bolt-coupled through a bolt coupled to the front fixing portion 180 or the rear fixing portion 380. In this example, a sliding bar connected to the front frame 160 or the rear frame 360 may be connected to the sliding slots to adjust heights. This is merely an illustrative example, and various types of coupling such as hook type or adhesive type may be considered such that the height of the front body 140 and front frame 160, or the rear body 340 and the rear frame 360 may be flexibly adjusted.

Specific example embodiments of the present disclosure have been illustrated and described, but those skilled in the art to which the present disclosure pertains may variously improve upon and modify an embodiment within the scopes not deviating from the technical spirit of the present disclosure provided in the following patent claims, including equivalents thereof.

What is claimed is:

1. A vehicle body of a vehicle, comprising:
    a front structure of the vehicle body including a front wheel of the vehicle;
    a rear structure of the vehicle body including a rear wheel of the vehicle;
    a rotation shaft extending in a longitudinal direction of the vehicle, connecting the front structure and the rear structure, and configured to allow the front structure and the rear structure to rotate relative to each other; and
    an elastic system configured to provide a return force in an opposite direction of relative rotation in response to the front structure and the rear structure rotating relative to each other;
    wherein the front structure and the rear structure are able to rotate relative to each other about a center of the rotation shaft;
    wherein the elastic system includes an elastic body configured to store an elastic force upon compression; and
    wherein the elastic body is connected to the front structure or the rear structure depending on a relative rotation direction of the front structure and the rear structure.

2. The vehicle body of claim 1, wherein the front structure includes a single front wheel as the front wheel, and wherein the rear wheel is one of a plurality of rear wheels.

3. The vehicle body of claim 1, further comprising:
    a front frame provided in the front structure; and
    a rear frame provided in the rear structure, wherein the rotation shaft has a first end fixed to either one of the front frame or the rear frame, and a second end rotatably coupled to another of the rear frame or the front frame, respectively, wherein when the first end of the rotation shaft is fixed to the front frame then the second end of the rotation shaft is rotatably coupled to the rear frame, and wherein when the first end of the rotation shaft is fixed to the rear frame then the second end of the rotation shaft is rotatably coupled to the front frame.

4. The vehicle body of claim 3, wherein the elastic body is configured to compress in response to the front frame and the rear frame rotating relative to each other.

5. The vehicle body of claim 4, wherein the elastic body is a spring extending in a width direction of the vehicle, wherein each end of the elastic body is selectively connected to the front frame or the rear frame depending on the relative rotation direction of the front frame and the rear frame.

6. The vehicle body of claim 4, further comprising:
    a mounting bracket provided on the front frame or the rear frame, wherein the mounting bracket comprises a slit hole therein, wherein elastic-body ends of the elastic body lock into respective slit-hole ends of the slit hole; and
    a pair of forks provided outside of the slit hole on the rear frame or front frame, respectively, wherein when the mounting bracket is on the front frame then the pair of forks are on the rear frame, wherein when the mounting bracket is on the rear frame then the pair of forks are on the front frame, and wherein the elastic body is configured to be compressed by one of the forks pressing against one of the elastic-body ends of the elastic body in response to the front frame and the rear frame rotating relative to each other.

7. The vehicle body of claim 6, wherein the elastic body is disposed in a width direction of the vehicle, and further comprising a pair of locking pins respectively coupled to each of the elastic-body ends of the elastic body, and the pair of locking pins being respectively secured against each of the slit-hole ends of the slit hole to be supported thereby, and wherein the pair of locking pins are selectively or simultaneously supported by the pair of forks respectively.

8. The vehicle body of claim 7, further comprising a pair of spring cups respectively coupled to each of the elastic-body ends of the elastic body, wherein each of the spring cups has one end open toward the elastic body and wherein the spring cups are positioned above the pair of forks.

9. The vehicle body of claim 8, wherein the pair of forks each comprise a coupling notch therein, wherein the pair of spring cups may be coupled to the mounting bracket through the locking pins in a state for which the pair of spring cups fixedly lock into the coupling notches.

10. The vehicle body of claim 8, further comprising an adjustment screw at one of the elastic-body ends of the elastic body, wherein the adjustment screw passes through one of the spring cups to couple to the elastic body, and configured such that the elastic body can be compressed or stretched in its axial direction by an adjustment rotation of the adjustment screw so that the elastic force of the elastic body can be adjusted by the adjustment screw.

11. The vehicle body of claim 10, further comprising an adjustment disk provided between the elastic body and the one of the spring cups including the adjustment screw, wherein the adjustment disk is configured to move in the axial direction of the elastic body together with the adjustment screw in response to the adjustment screw being rotated.

12. The vehicle body of claim 7, wherein the pair of locking pins and the pair of forks are simultaneously supported in a first state where the front frame and the rear frame of the vehicle are aligned straight without rotating relative to each other and selectively supported in a second state where the front frame and the rear frame of the vehicle are rotated relative to each other.

13. The vehicle body of claim 1, further comprising a tilting brake provided between the front structure and the rear structure, wherein the tilting brake is configured to brake rotation of the front structure and the rear structure relative to each other in response to the tilting brake being engaged.

14. A vehicle body of a vehicle, comprising:
a front structure of the vehicle body including a front wheel of the vehicle;
a rear structure of the vehicle body including a rear wheel of the vehicle;
a rotation shaft connecting the front structure and the rear structure and configured to allow the front structure and the rear structure to rotate relative to each other;
an elastic system configured to provide a return force in an opposite direction of relative rotation in response to the front structure and the rear structure rotating relative to each other;
a front frame provided in the front structure;
a rear frame provided in the rear structure, wherein the rotation shaft has a first end fixed to either one of the front frame or the rear frame, and a second end rotatably coupled to another of the rear frame or the front frame, respectively, wherein when the first end of the rotation shaft is fixed to the front frame then the second end of the rotation shaft is rotatably coupled to the rear frame, and wherein when the first end of the rotation shaft is fixed to the rear frame then the second end of the rotation shaft is rotatably coupled to the front frame;
a stopping protrusion provided on an outer circumferential surface of the second end of the rotation shaft;
a limiting protrusion base provided on the front frame or rear frame; and
a pair of limiting protrusions provided to face each other at each of limiting-protrusion-base ends of the limiting protrusion base, and wherein the stopping protrusion and the pair of limiting protrusions are configured such that the stopping protrusion can move between the pair of limiting protrusions so that a relative rotation angle of the front frame and the rear frame is limited.

15. The vehicle body of claim 14, wherein the limiting protrusion base has a "U" shape with an open surface toward the stopping protrusion, wherein each of the limiting protrusions is positioned at each limiting-protrusion-base end of the limiting protrusion base, respectively, and configured such that the stopping protrusion can alternatively come into contact with one of the pair of limiting protrusions inside the open surface of the limiting protrusion base so that the relative rotation angle is limited.

16. The vehicle body of claim 14, wherein each of the pair of limiting protrusions comprises a bolt, wherein threaded holes are at both of the limiting-protrusion-base ends of the limiting protrusion base to be threadedly-coupled to the pair of limiting protrusions, respectively, and configured such that the relative rotation angle of the stopping protrusion can be adjusted by altering a bolt-coupling position of at least one of the pair of limiting protrusions.

17. The vehicle body of claim 1, wherein the front structure includes a front body and a front frame, and wherein the rear structure includes a rear body and a rear frame.

18. A vehicle body of a vehicle, comprising:
a front structure of the vehicle body including a front wheel of the vehicle, a front body, and a front frame, wherein the front body and the front frame may slide up and down relative to each other by a front fixing portion configured to fix a first relative position to which the front body and the front frame slide;
a rear structure of the vehicle body including a rear wheel of the vehicle, a rear body and a rear frame, wherein the rear body and the rear frame may slide up and down relative to each other by a rear fixing portion configured to fix a second relative position to which the rear body and the rear frame slide;
a rotation shaft connecting the front structure and the rear structure and configured to allow the front structure and the rear structure to rotate relative to each other; and
an elastic system configured to provide a return force in an opposite direction of relative rotation in response to the front structure and the rear structure rotating relative to each other.

19. The vehicle body of claim 13, further comprising a brake handle provided in the front structure of the vehicle, wherein the brake handle is coupled to the tilting brake in a configuration such that the tilting brake can be engaged by manipulating the brake handle.

20. The vehicle body of claim 3, wherein the front structure of the vehicle includes a front seat, wherein the front frame is provided under the front seat, the rear frame is disposed behind the front frame, and the rotation shaft extending in a length direction is provided between the front frame and the rear frame.

* * * * *